United States Patent
Chang et al.

(10) Patent No.: US 8,667,475 B2
(45) Date of Patent: Mar. 4, 2014

(54) COMPUTER-READABLE STORAGE MEDIUM AND PROGRAM-CONVERTING METHOD

(75) Inventors: Wan-Kun Chang, Hsinchu (TW);
Chin-Chu Sun, Hsinchu (TW);
Cheng-Yu Chen, Hsinchu (TW);
Yung-Ming Kao, Hsinchu (TW);
Shih-Chang Liang, Hsinchu (TW)

(73) Assignee: Industrial Technology Research Institute, Hsinchu (TW)

( * ) Notice: Subject to any disclaimer, the term of this patent is extended or adjusted under 35 U.S.C. 154(b) by 641 days.

(21) Appl. No.: 12/972,812

(22) Filed: Dec. 20, 2010

(65) Prior Publication Data

US 2012/0109361 A1     May 3, 2012

(30) Foreign Application Priority Data

Nov. 2, 2010 (TW) ................................ 99137584 A

(51) Int. Cl.
*G06F 9/45* (2006.01)
(52) U.S. Cl.
USPC ........................... 717/140; 717/136; 717/137
(58) Field of Classification Search
USPC ......................................... 717/136, 137, 140
See application file for complete search history.

(56) References Cited

U.S. PATENT DOCUMENTS

| | | | |
|---|---|---|---|
| 5,828,574 A * | 10/1998 | Robinson et al. | 700/173 |
| 6,480,896 B1 * | 11/2002 | Brown et al. | 709/231 |
| 7,024,666 B1 * | 4/2006 | Brown | 717/137 |
| 7,039,492 B2 | 5/2006 | Sugiyama | |
| 2003/0158622 A1 | 8/2003 | Corey | |
| 2009/0271028 A1 | 10/2009 | Freeman | |
| 2012/0095599 A1 * | 4/2012 | Pak et al. | 700/275 |

FOREIGN PATENT DOCUMENTS

| | | | | |
|---|---|---|---|---|
| EP | 0717866 B1 | * | 11/1997 | ........... G05B 19/414 |
| JP | 61-025212 A | | 2/1986 | |
| JP | 63-239511 A | | 10/1988 | |
| JP | 01226005 A | | 9/1989 | |
| JP | 02-024704 A | | 1/1990 | |
| JP | 03-277452 A | | 12/1991 | |
| JP | 09-047990 A | | 2/1997 | |
| JP | 10-177406 A | | 6/1998 | |
| JP | 2000-099123 A | | 4/2000 | |
| JP | 2001-175315 A | | 6/2001 | |
| JP | 2003-044109 A | | 2/2003 | |

(Continued)

OTHER PUBLICATIONS

Bona et al., "Architectures for Rapid Prototyping of Model-based Robot Controllers", 2004.*

(Continued)

*Primary Examiner* — Phillip H Nguyen
(74) *Attorney, Agent, or Firm* — Rabin & Berdo, P.C.

(57) ABSTRACT

A program-converting module for a multi-axis cooperated machine and a program-converting method. Machining programs and mechanism data of a plurality of first machines are input to a first input module. Mechanism data of a plurality of second machines are input to a second input unit. A setting unit sets at least one of the first machines to be a source machine, and sets one of the second machines to be a target machine. A conversion unit uses a kinematical method to convert the machining program of the source machine into a machining program applicable to the target machine based on the mechanism data of the source and target machines, without requiring CAD/CAM software.

16 Claims, 4 Drawing Sheets

(56) References Cited

FOREIGN PATENT DOCUMENTS

| | | |
|---|---|---|
| JP | 2005-305579 A | 11/2005 |
| JP | 2008-287471 A | 11/2008 |
| JP | 2009-146152 A | 7/2009 |
| JP | 2009-211369 A | 9/2009 |
| JP | 2009-217326 A | 9/2009 |
| TW | 200805017 A | 1/2008 |

OTHER PUBLICATIONS

Huang, "Development of the Numerical Control Program for a Five-axis Machine Tool with Nonorthogonal Rotary Axis", Department of Mechanical and Automation Engineering Da-Yeh University, pp. 1-89, 2007.

She, "Studies on the Five-axis Numerical Control Programming System for Machining of Spatial Cam", Department of Mechanical Engineering National Cheng-Kung University, pp. 1-205, Jul. 1997.

Lin, "Studies on the Postprocessor Algorithm for Multi-axis Numerical Control Machine Tools", Department of Mechanical Engineering Da-Yeh University, pp. 1-122, Jun. 2001.

* cited by examiner

```
                                                ┌─S31
┌─────────────────────────────────────────────┐/
│ inputting machining programs and mechanism data │
│ of a plurality of first machines and mechanism data │
│ of a plurality of second machines             │
└─────────────────────────────────────────────┘
                        │
                        ▼                     ┌─S32
┌─────────────────────────────────────────────┐/
│ setting at least one of the first machines to be a │
│ source machine, and setting one of the second │
│ machines to be a target machine              │
└─────────────────────────────────────────────┘
                        │
                        ▼                     ┌─S33
┌─────────────────────────────────────────────┐/
│ using a forward kinematical method to convert the │
│ machining program of the source machine from a │
│ joint coordinate to a Cartesian coordinate based │
│ on the mechanism data of the source machine  │
└─────────────────────────────────────────────┘
                        │
                        ▼                     ┌─S34
┌─────────────────────────────────────────────┐/
│ using an reverse kinematical method to convert │
│ the machining program of the source machine that │
│ has been converted into the Cartesian coordinate │
│ into the joint coordinate based on the mechanism │
│ data of the target machine, so as to generate the │
│ machining program that is applicable to the target │
│ machine                                      │
└─────────────────────────────────────────────┘
```

FIG. 3

| | 4 |
|---|---|
| five-axis machine type | 2 |
| solution selection | 1 |
| rotation axis (left hand/right hand rule) | 1 |
| central offset vectors from workpieces to a rotation axis (Lx) | 5 |
| central offset vectors from workpieces to a rotation axis (Ly) | 3 |
| central offset vectors from workpieces to a rotation axis (Lz) | 4.21 |

FIG. 4

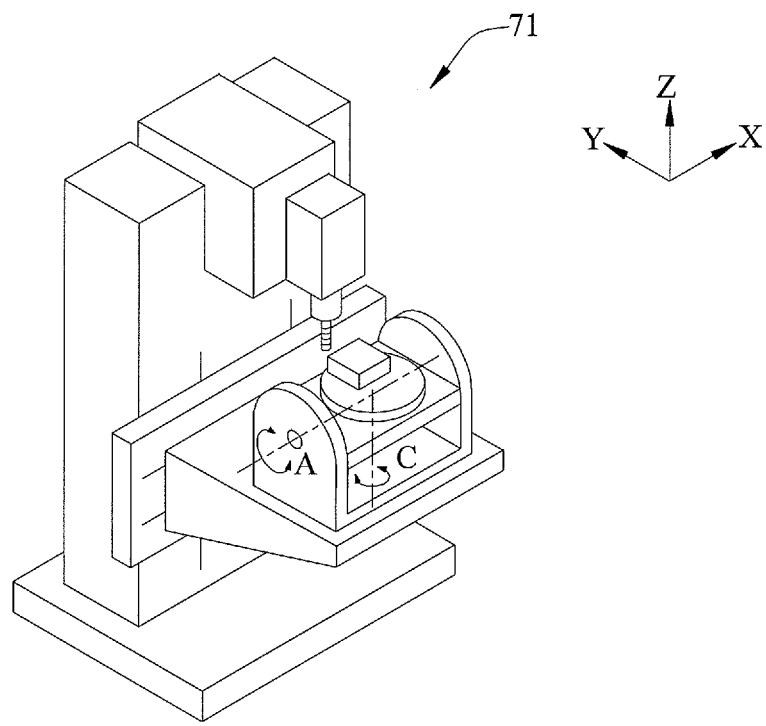
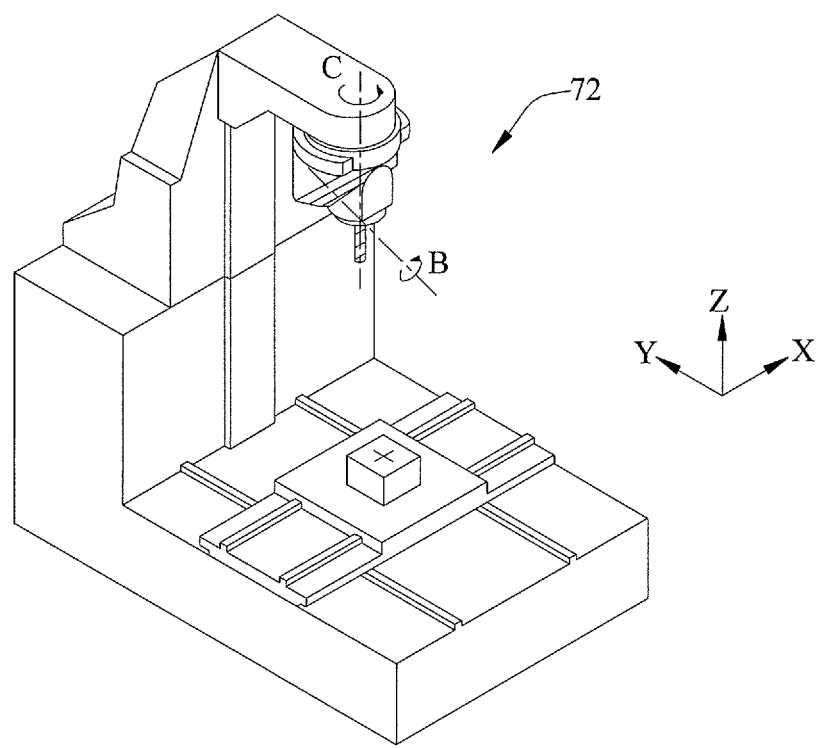
FIG. 6

COMPUTER-READABLE STORAGE MEDIUM AND PROGRAM-CONVERTING METHOD

TECHNICAL FIELD

This disclosure relates to program-converting modules for multi-axis coordinated machines and program-converting methods, and, more particularly, to a program-converting module for multi-axis coordinated machines that have different configurations and a program-converting method.

BACKGROUND

Computer numerical control (CNC) machine tools may be programmed to perform high-precision processes. A programmer may write CNC machining programs based on processes, routes or precision required by workpieces to be processed.

In general, the programmer may use CAD/CAM software to write machining programs based on mechanism data of machines tools and predefined workpiece shapes, and apply the machining programs to machine tools that have at least four cooperated axes, wherein one of the machining programs corresponds to one machine tool. As shown in FIG. 1, CAD/CAM software 11 generates CNC machining programs, i.e., GM codes, based on mechanism data of a machine tool A, and the GM codes are input to a controller 12 of the machine tool A, to control the machine tool A to perform a process. However, every machine tool has its own prescribed mechanism data, and a machining program that is applicable to the machine tool A cannot be applied to a machine tool B, a machine tool C or other machine tools that have configurations different from that of the machine tool A.

With regard to a machine tool that has four cooperated axes that have different configurations, machining programs have to be rewritten, in order to comply with the machining programs of the CNC machine tools. Alternatively, the CAD/CAM software may be used to generate new machining programs that comply with the mechanism data of the CNC machine tools. However, it takes time and labor to rewrite machining programs. Further, the CAD/CAM software is expensive, and it takes a lot of money to use the CAD/CAM software to generate various machining programs that are applicable to different machine tools.

Therefore, how to use current CNC programs to convert programs among machines with multi-axis coordinated motion (i.e., multi-axis coordinated machines) that have different configurations, without rewriting CNC machining programs based on different mechanism data or using CAD/CAM software to convert the CNC machining programs, is becoming one of the urgent issues in the art.

SUMMARY

In view of the above-mentioned problems of the prior art, the disclosure provides a program-converting module and a program-converting method that are applied to multi-axis coordinated machines that have different configurations, to convert machining programs of the multi-axis coordinated machines.

The program-converting module for multi-axis coordinated machines includes: a first input unit, to which machining programs and mechanism data of a plurality of first machines are input; a second input unit, to which mechanism data of a plurality of second machines are input, the second machines having a second configuration different from a first configuration of the first machines; a setting unit that sets at least one of the first machines to be a source machine, and sets one of the second machines to be a target machine; and a conversion unit that uses a kinematical method to convert the machining program of the source machine into a machining program of the target machine based on the mechanism data of the source and target machines.

The machining programs of the first machines are a joint coordinate, and the conversion unit includes: a forward conversion member that uses a forward kinematical method to convert the machining program of the source machine from the joint coordinate to a Cartesian coordinate based on the mechanism data of the source machine; and an inverse conversion member that uses an inverse kinematical method to convert the machining program of the source machine that has been converted into the Cartesian coordinate into the joint coordinate based on the mechanism data of the target machine, so as to generate the machining program that is applicable to the target machine.

The program-converting method for multi-axis coordinated machines includes: (1) inputting machining programs and mechanism data of a plurality of first machines and mechanism data of a plurality of second machines, the second machines having a second configuration different from a first configuration of the first machines; (2) setting at least one of the first machines to be a source machine, and setting one of the second machines to be a target machine; and (3) using a kinematical method to convert the machining program of the source machine into a machining program that is applicable to the target machine based on the mechanism data of the source and target machines.

The mechanism data of the first machines or of the second machines are input by GM codes, Macros, global or local variables, machine parameters, machining program functions or human-machine interfaces.

Compared with the prior art, the program-converting module and the program-converting method that are applied to multi-axis coordinated machines may convert CNC machining programs generated by CAD/CAM software into machining programs that are applicable to machines that have different mechanism data, so as to solve the problem of the prior art that a certain one of machining programs (e.g. GM codes) may be applied to only one multi-axis coordinated machine, but cannot be applied to other multi-axis coordinated machines that have different configurations.

BRIEF DESCRIPTION OF DRAWINGS

The disclosure can be more fully understood by reading the following detailed description of the preferred embodiments, with reference made to the accompanying drawings, wherein:

FIG. 3 is a flow chart of a program-converting method for multi-axis coordinated machines according to the disclosure;

FIG. 4 is a schematic diagram of a human-machine interface of the program-converting module according to the disclosure FIG. 6 is a schematic diagram of multi-axis coordinated machines to which a program-converting method of the disclosure is applied.

DETAILED DESCRIPTION OF PREFERRED EMBODIMENTS

The following illustrative embodiments are provided to illustrate the disclosure of the disclosure, these and other advantages and effects can be apparently understood by those in the art after reading the disclosure of this specification. The disclosure can also be performed or applied by other different embodiments. The details of the specification may be on the basis of different points and applications, and numerous modifications and variations can be devised without departing from the spirit of the disclosure.

Figure 1:
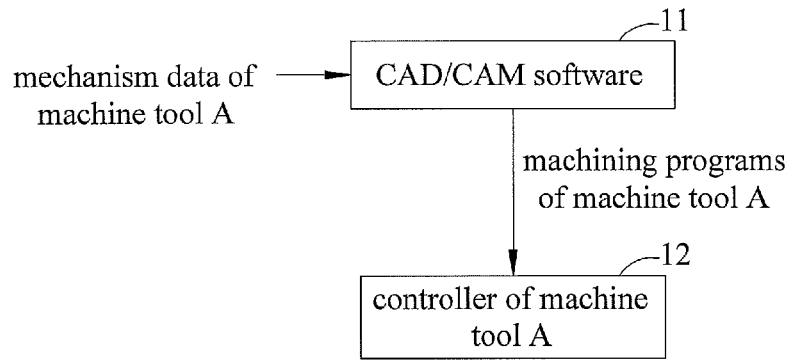
FIG. 1 is a flow chart illustrating how a CNC machine tool generates machining programs according to the prior art.
Figure 2:
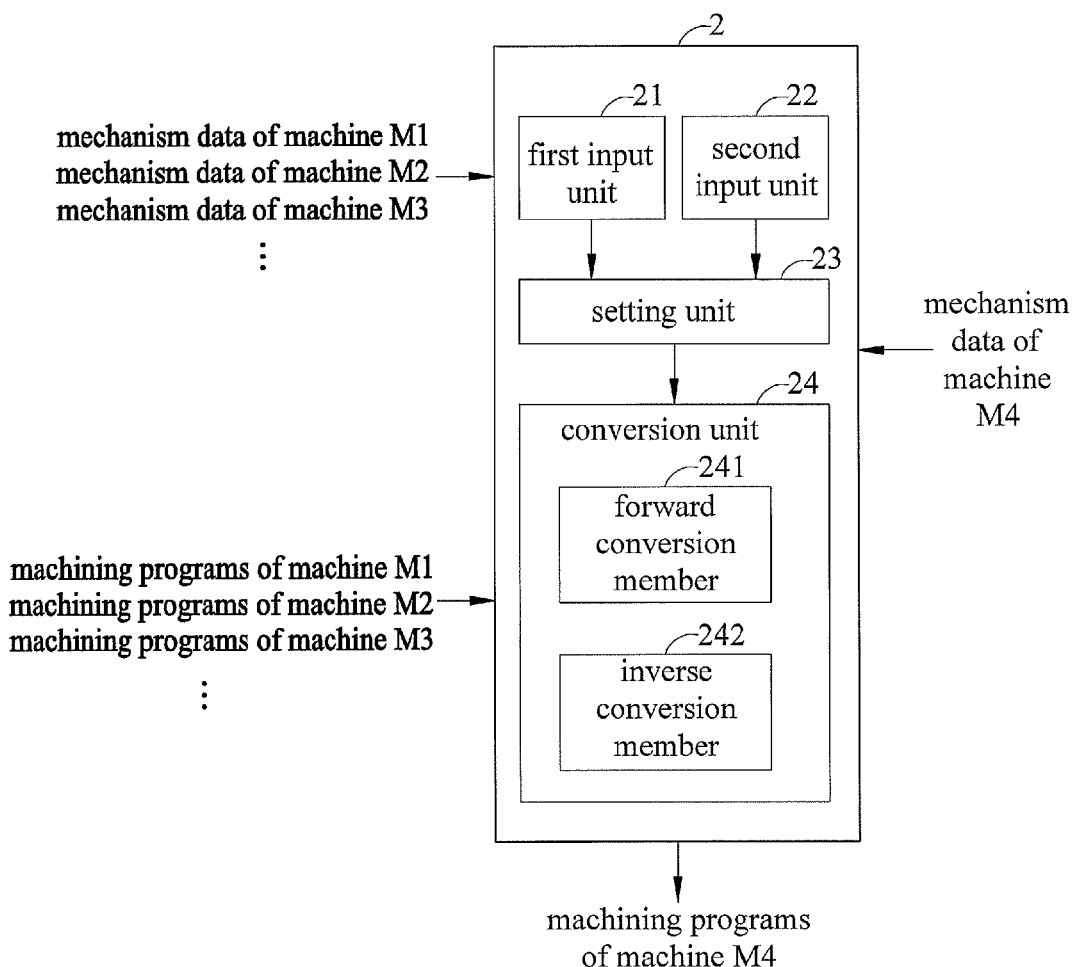
FIG. 2 is a functional block diagram of a program-converting module for multi-axis coordinated machines according to the disclosure.

Please refer to FIG. 2, which is a functional block diagram of a program-converting module 2 that is applicable to multi-axis coordinated machines according to the disclosure. The program-converting module 2 comprises a first input unit 21, a second input unit 22, a setting unit 23 and a conversion unit 24.

Machining programs and mechanism data of a plurality of first machines may be input to the first input unit 21. The first machines include multi-axis coordinated machines M1, M2 and M3, and machining programs of the multi-axis coordinated machines M1, M2 and M3 are generated by CAD/CAM software. The first input unit 21 may be a GM code input unit, Macros input unit, global or local variable input unit, machine parameter input unit, machining program function input unit and/or human-machine interface. The first input unit 21 may receive GM codes, Macros, global or local variables, machine parameters or machining program functions that are input externally.

Mechanism data of the second machines, such as mechanism data of a multi-axis coordinated machine M4, may be input to the second input unit 22. The mechanism data of a machine indicate multi-axis machine types, rotation axis direction definitions or central offset vectors from workpieces to rotation axes.

The setting unit 23 sets at least one of the multi-axis coordinated machines M1, M2 and M3 to be a source machine, and sets one of the second machines to be a target machine. As shown in FIG. 2, the mechanism data of only one multi-axis coordinated machine M4 is input, and, as such, the multi-axis coordinated machine M4 is the target machine.

The conversion unit 24 uses a kinematical method to convert the machining program of the source machine into a machining program that is applicable to the multi-axis coordinated machine M4 based on the mechanism data of the source machine (the multi-axis coordinated machine M1, M2 and M3) and the multi-axis coordinated machine M4 set by the setting unit 23. If the multi-axis coordinated machine M1 is set to be the source machine, the conversion unit 24 converts the machining program of the multi-axis coordinated machine M1 into the machining program that is applicable to the multi-axis coordinated machine M4 based on the mechanism data of the multi-axis coordinated machine M1 and the multi-axis coordinated machine M4.

The program-converting module 2 may further comprises a storing unit (not shown) that stores the machining programs and the mechanism data of the multi-axis coordinated machines M1, M2 and M3 and the mechanism data of the at least one second machine (the multi-axis coordinated machine M4).

As shown in FIG. 2, the conversion unit 24 comprises a forward conversion member 241 and an inverse conversion member 242. The forward conversion member 241 uses a forward kinematical method to convert the machining programs of a source machine (e.g., the multi-axis coordinated machine M1) from a joint coordinate into a Cartesian coordinate based on the mechanism data of the source machine (the multi-axis coordinated machine M1).

The inverse conversion member 242 uses an inverse kinematical method to convert the machining program of the source machine (multi-axis coordinated machine M1) that has been converted into the Cartesian coordinate into the joint coordinate according to the mechanism data of the target machine (the multi-axis coordinated machine M4), so as to generate the machining program that is applicable to the target machine (multi-axis coordinated machine M4).

The program-converting module 2 may receive the machining programs and mechanism data of a plurality of multi-axis coordinated machines M1, M2 and M3 and mechanism data of at least one second machine (the multi-axis coordinated machine M4), and sets at least one of the multi-axis coordinated machines M1, M2 and M3 to be the source machine. If only one source machine is set, a one-to-one machining program conversion is performed. If at least two source machine is set, a multiple-to-one machining program conversion is performed, i.e., integrating machining programs of multiple machines into one machining program of a single one target machine.

FIG. 2 is used to further illustrate a flow chart of a program-converting method that is applicable to multi-axis coordinated machines. Refer to FIG. 3. In step S31, machining programs and mechanism data of a plurality of first machines (the multi-axis coordinated machine M1, M2 and M3) are input to the first input unit 21, and mechanism data of a plurality of second machines (the multi-axis coordinated machine M4) are input to the second input unit 22, wherein, the machining programs are in a joint coordinate format.

In step S32, the setting unit 23 sets at least one of the first machines (the multi-axis coordinated machine M1, M2 and M3) to be a source machine, and sets one of the second machines (the multi-axis coordinated machine M4) to be a target machine.

Then, a kinematical method is used to convert the machining program of the source machine into a machining program that is applicable to the target machine based on the mechanism data of the source machine (the multi-axis coordinated machine M1, M2 and M3) and the target machine (the multi-axis coordinated machine M4). That is, the conversion unit 24 uses a forward kinematical methods in step S33 to convert the machining program of the set source machine from the joint coordinate to the Cartesian coordinate based on the mechanism data of the set source machine, and uses a inverse kinematical method in step S34 to convert the machining program of the source machine that has been converted into the Cartesian coordinate into the joint coordinate based on the mechanism data of the set target machine (the multi-axis coordinated machine M4), so as to be the machining program format that is applicable to the set target machine (the multi-axis coordinated machine M4).

In step S31, the mechanism data are input to the machines by GM codes, Macros, global or local variables, machine parameters, machining program functions or human-machine interfaces, wherein data input by the human-machine interfaces indicate multi-axis machine types, rotation axis direction definitions or central offset vectors from workpieces to rotation axes, and the multi-axis machine types include a five-axis machine type. FIG. 4 shows a human-machine interface 4 of a program-converting module that is applicable to multi-axis coordinated machines according to the disclosure.

The human-machine interface 4 is used to input mechanism data, such as multi-axis types, rotation axis direction definitions or central offset vectors from workpieces to rotation axes, wherein the multi-axis machine types include a five-axis machine type.

It can be known from the program-converting module shown in FIG. 2 and the program-converting method shown in FIG. 3 that the disclosure can be applied to convert programs among multi-axis coordinated machines that have different configurations, without rewriting the machining programs based on different mechanism data, or using CAD/CAM software to convert the machining programs. Accordingly, the disclosure costs less and consumes less time, as compared with the prior art.

The program-converting module may be installed in a controller of a multi-axis coordinated machine, or installed externally to the controller of the multi-axis coordinated machine and wirelessly connected to the controller or connected to the controlled via a cable or network.

Figure 5:
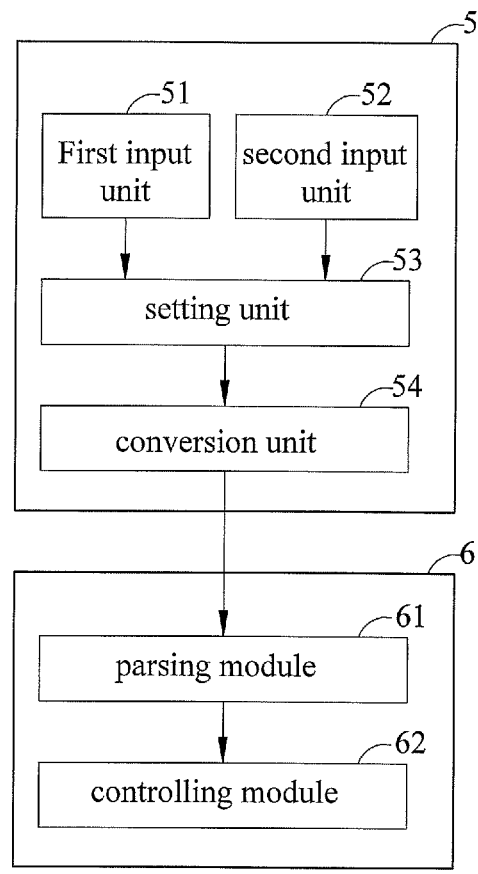
FIG. 5 is a functional block diagram of a program-converting module for multi-axis coordinated machines according to the disclosure.

Please refer to FIG. 5, which is a schematic diagram of a program-converting module 5 that is connected to a controller 6 of a multi-axis coordinated machine according to the disclosure. Machining programs and mechanism data of a plurality of first machines are input to a first input unit 51; mechanism data of the multi-axis coordinated machine are input to a second input unit 52; a setting unit 53 sets at least one of the first machines to be source machines; and a conversion unit 54 uses a kinematical method to convert the machining programs of the source machines to be a machining program that is applicable to the multi-axis coordinated machine based on the mechanism data of the source machines and the multi-axis coordinated machine, and transmits the converted machining programs to the controller 6 of the multi-axis coordinated machine. A parsing module 61 of the controller 6 parses the converted machining program that is applicable to the multi-axis coordinated machine, and a controlling module 62 controls the multi-axis coordinated machine to execute a process.

Please refer to FIG. 6, which is a schematic diagram of multi-axis coordinated machines to which a program-converting method of the disclosure is applied. It can be known from FIG. 6 that a multi-axis coordinated machine 71 and a multi-axis coordinated machine 72 have different configurations; the multi-axis coordinated machine 71 has rotation axes A and C; and the multi-axis coordinated machine 72 has rotation axes B and C, wherein the rotation axis A is in a direction X, and the rotation axis B is in a direction Y. It is thus apparent that the multi-axis coordinated machine 71 and the multi-axis coordinated machine 72 cannot use the same machining program. Accordingly, the multi-axis coordinated machine 71 is set to be a source machine, and the multi-axis coordinated machine 72 is set to be a target machine. Therefore, a machining program that is applicable to the multi-axis coordinated machine 71 originally may be converted into a machining program that is applicable to the multi-axis coordinated machine 72 by the program-converting module of the disclosure.

In conclusion, the program-converting module and the program-converting method that are applied to multi-axis coordinated machines of the disclosure may convert an original machining program into a machining program that may be applicable to a multi-axis coordinated machine that has a different configuration, such that machining programs of multiple multi-axis coordinated machines that have different configurations may be integrated into a machining program that is applicable to one multi-axis coordinated machine. Accordingly, the original machining program may be widely applied to multiple multi-axis coordinated machines that have different configurations, and the time and cost required for machining program conversion are reduced.

The foregoing descriptions of the detailed embodiments are only illustrated to disclose the features and functions of the disclosure and not restrictive of the scope of the disclosure. It should be understood to those in the art that all modifications and variations according to the spirit and principle in the disclosure of the disclosure should fall within the scope of the appended claims.

What is claimed is:

1. A computer-readable storage medium which stores non-transitory instructions which, when executed by a computer, perform a program-converting method for multi-axis coordinated machines and are applied to a program-converting device having a first input circuit, a second input circuit, a setting circuit and a conversion circuit, the program-converting method comprising:
   inputting machining programs and mechanism data of a plurality of first machines to the first input circuit;
   inputting mechanism data of a plurality of second machines to the second input circuit, the second machines each having a second configuration different from a first configuration of each of the first machines;
   setting at least one of the first machines to be a source machine and setting one of the second machines to be a target machine by the setting circuit; and
   using a kinematical method by the conversion circuit to convert a machining program of the source machine into a machining program applicable to the target machine based on the mechanism data of the source machine and the target machine.

2. The computer-readable storage medium of claim 1, wherein the mechanism data of the first and second machines are GM codes, Macros, global or local variables, machine parameters or machining program functions.

3. The computer-readable storage medium of claim 1, wherein the program-converting method further comprises storing the machining programs and the mechanism data of the first machines and the mechanism data of the second machines in a storing circuit.

4. The computer-readable storage medium of claim 1, wherein the machining programs of the first machines are a joint coordinate.

5. The computer-readable storage medium of claim 4, wherein the program-converting method further comprises:
   using a forward kinematical method by a forward conversion circuit to convert the machining program of the source machine from the joint coordinate to a Cartesian coordinate based on the mechanism data of the source machine; and
   using an inverse kinematical method by an inverse conversion circuit to convert the machining program of the source machine that has been converted into the Cartesian coordinate into the joint coordinate based on the mechanism data of the target machine, so as to generate the machining program that is applicable to the target machine.

6. The computer-readable storage medium of claim 1, wherein the mechanism data are multi-axis machine types, rotation axis direction definitions or central offset vectors from workpieces to rotation axes.

7. The computer-readable storage medium of claim 1, wherein the program-converting device is externally connected to a controller of the target machine, and the controller of the target machine executes the machining program converted by the conversion circuit that is applicable to the target machine.

8. The computer-readable storage medium of claim 1, wherein the program-converting device is installed in a controller of the target machine, and the controller of the target machine executes the machining program converted by the conversion circuit that is applicable to the target machine.

9. A program-converting method for multi-axis coordinated machines, comprising:
   (1) inputting machining programs and mechanism data of a plurality of first machines and mechanism data of a plurality of second machines, the second machines having a second configuration different from a first configuration of the first machines;
   (2) setting at least one of the first machines to be a source machine, and setting one of the second machines to be a target machine; and
   (3) using a kinematical method to convert a machining program of the source machine into a machining program that is applicable to the target machine based on the mechanism data of the source machine and target machine.

10. The program-converting method of claim 9, wherein step (1) further comprises storing the machining programs and the mechanism data of the first machines and the mechanism data of the second machines.

11. The program-converting method of claim 9, wherein the machining programs of the first machines are a joint coordinate.

12. The program-converting method of claim 11 wherein step (3) comprises:
   (3-1) using a forward kinematical method to convert the machining program of the source machine from the joint coordinate to a Cartesian coordinate based on the mechanism data of the source machine; and
   (3-2) using an inverse kinematical method to convert the machining program of the source machine that has been converted into the Cartesian coordinate into the joint coordinate based on the mechanism data of the target machine, so as to generate the machining program that is applicable to the target machine.

13. The program-converting method of claim 9, wherein the mechanism data are multi-axis machine types, rotation axis direction definitions or central offset vectors from workpieces to rotation axes.

14. The program-converting method of claim 9, wherein the mechanism data of the first machines or of the second machines are input by GM codes, Macros, global or local variables, machine parameters, machining program functions or human-machine interfaces.

15. The program-converting method of claim 14, wherein the data input by the human-machine interfaces are multi-axis machine types, rotation axis direction definitions or central offset vectors from workpieces to rotation axes.

16. The program-converting method of claim 14, wherein the multi-axis machine types include a five-axis machine type.

* * * * *